(12) United States Patent
Ajioka et al.

(10) Patent No.: US 8,587,903 B2
(45) Date of Patent: Nov. 19, 2013

(54) SUSPENSION WITH HIGH CONDUCTIVITY GROUND LAYER

(75) Inventors: Eriko Ajioka, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 8 days.

(21) Appl. No.: 13/302,887

(22) Filed: Nov. 22, 2011

(65) Prior Publication Data

US 2013/0128388 A1    May 23, 2013

(51) Int. Cl.
*G11B 5/48* (2006.01)
*G11B 21/16* (2006.01)

(52) U.S. Cl.
USPC .................................. 360/244.1; 360/245.8

(58) Field of Classification Search
USPC .................................... 360/244.1, 245.8–246
See application file for complete search history.

(56) References Cited

U.S. PATENT DOCUMENTS

| | | | | |
|---|---|---|---|---|
| 5,862,010 | A * | 1/1999 | Simmons et al. | 360/99.15 |
| 7,158,348 | B2 * | 1/2007 | Erpelding et al. | 360/245.9 |
| 7,307,817 | B1 * | 12/2007 | Mei | 360/245.7 |
| 8,085,506 | B1 * | 12/2011 | Ee et al. | 360/245.8 |
| 8,094,413 | B1 * | 1/2012 | Hentges et al. | 360/245.9 |
| 2002/0071218 | A1 * | 6/2002 | Shiraishi et al. | 360/245.9 |
| 2003/0202283 | A1 * | 10/2003 | Arya et al. | 360/244.3 |
| 2004/0252413 | A1 * | 12/2004 | Nishiyama | 360/245.9 |
| 2006/0044695 | A1 * | 3/2006 | Erpelding | 360/245.9 |
| 2006/0187587 | A1 * | 8/2006 | Arai et al. | 360/245.9 |
| 2007/0131449 | A1 * | 6/2007 | Funada et al. | 174/254 |
| 2008/0151436 | A1 * | 6/2008 | Sato et al. | 360/313 |
| 2011/0090602 | A1 * | 4/2011 | Nishiyama et al. | 360/246.4 |

FOREIGN PATENT DOCUMENTS

| | | |
|---|---|---|
| JP | A-H09-54930 | 2/1997 |
| JP | A-2005-11387 | 1/2005 |
| JP | A-2010-73297 | 4/2010 |

OTHER PUBLICATIONS

Zhu et al. "Microwave Assisted Magnetic Recording" *IEEE Transactions on Magnetics*, vol. 44, No. 1, pp. 125-131 (Jan. 2008).
Wang et al. "Media damping constant and performance characteristics in microwave assisted magnetic recording with circular ac field," *Journal of Applied Physics*, 105 (2009).

* cited by examiner

*Primary Examiner* — Wayne Young
*Assistant Examiner* — Adam B Dravininkas
(74) *Attorney, Agent, or Firm* — Posz Law Group, PLC

(57) ABSTRACT

A suspension is configured to support a magnetic head slider having a recording head element for recording to a magnetic recording medium and a microwave generating element that applies a high-frequency magnetic field to the magnetic recording medium when recording is conducted by the recording head element. The suspension has a flexure that supports the magnetic head slider, a microwave signal transmission line and a recording signal transmission line. The microwave signal transmission line is connected to the microwave generating element and configured to transmit microwave signals for generating the high-frequency magnetic field. The microwave signal transmission line and the recording signal transmission line are supported between the main body part and the support part, a portion of which has a first lamination structure where a first ground layer is conductive and a first insulating layer supports the microwave signal transmission.

13 Claims, 12 Drawing Sheets

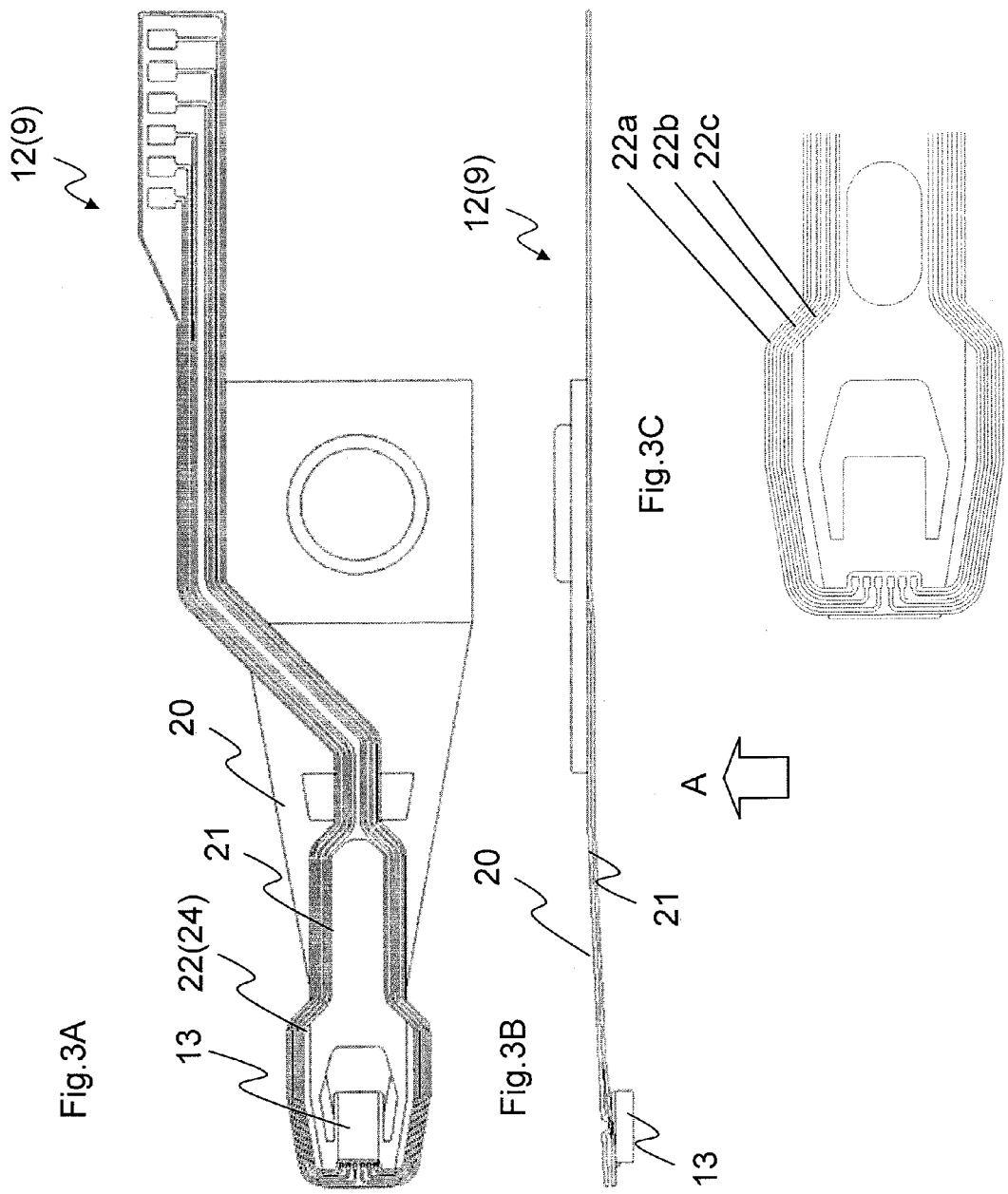

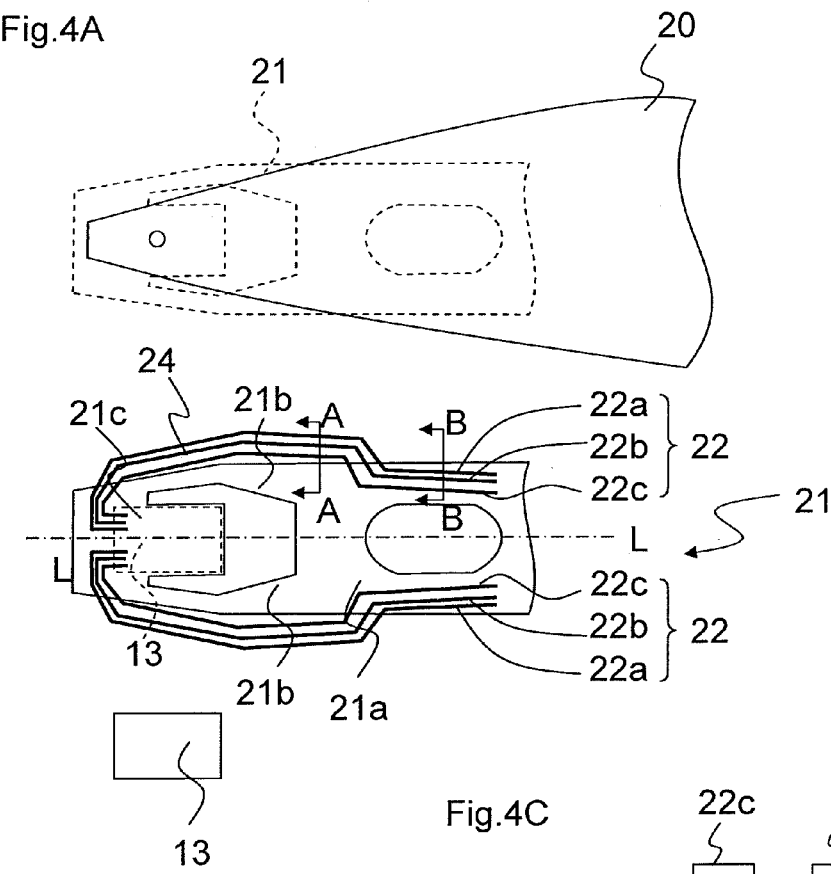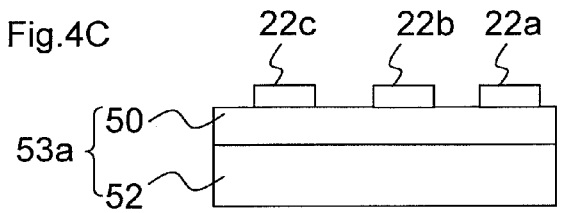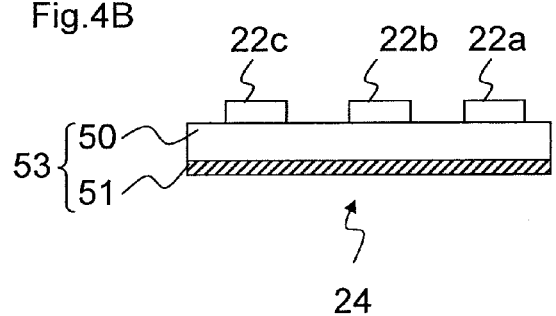

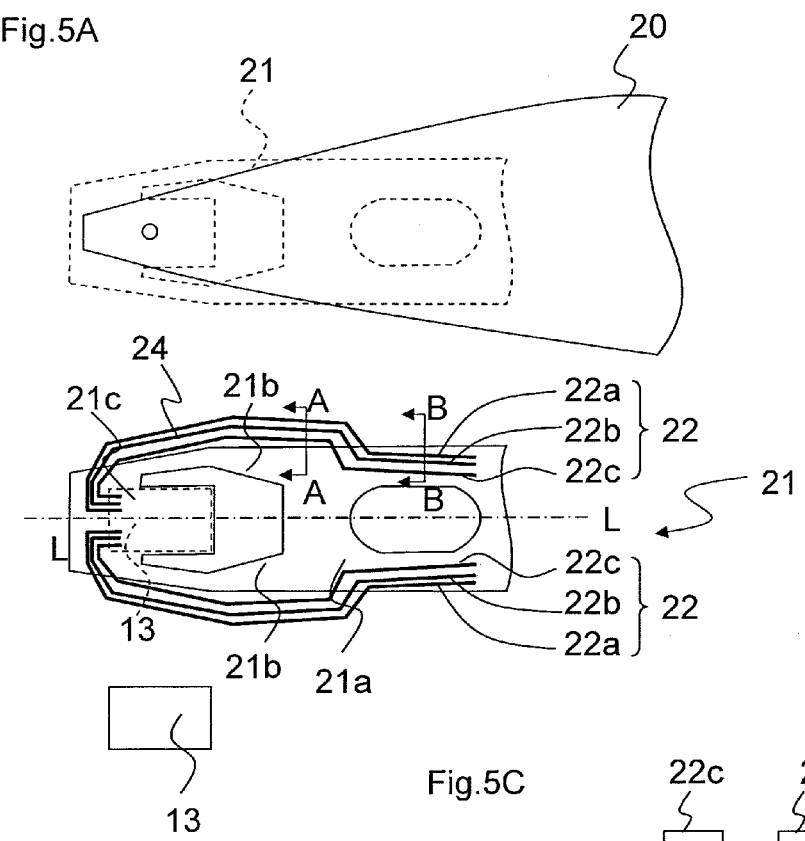
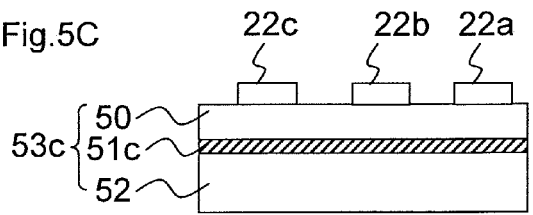
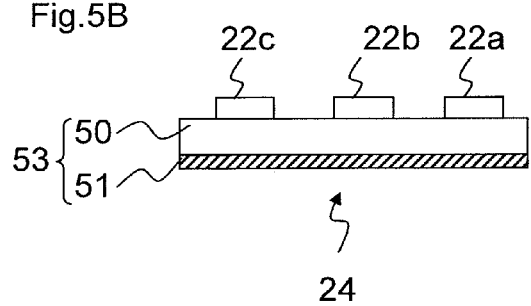

SUSPENSION WITH HIGH CONDUCTIVITY GROUND LAYER

BACKGROUND OF THE INVENTION

1. Field of the Invention

The present invention relates to a suspension that supports a magnetic head slider, and more particularly relates to a support structure of a microwave signal transmission line on the suspension that is configured to mount a magnetic head for microwave assisted recording.

2. Description of the Related Art

There is a demand for improvement in recording density of magnetic disk devices that are magnetic recording devices. In order to ensure the required signal quality (signal to noise (S/N) ratio) in high density recording, there is a need to reduce the size of magnetic particles that configure a magnetic recording medium in conjunction with the improvement of surface recording density. However, the magnetic particles having reduced size are more likely to cause a magnetization disappearance due to heat fluctuation. In order to prevent this problem and maintain a stable recording state, there is a need to increase magnetic anisotropy energy of the magnetic particles. When a material with high magnetic anisotropy energy is used, coercive force of the recording magnetic recording medium is increased, and therefore, a strong recording magnetic field becomes necessary to record to the magnetic recording medium. Meanwhile, the intensity of magnetic fields generated by a recording head element is restricted by the material and the shape of the recording head element, which makes recording difficult.

In order to resolve this technical problem, energy assisted recording has been proposed in which, at the time of recording, supplemental energy is applied to a magnetic recording medium to lower effective coercive force. A recording system using a microwave magnetic field as a supplemental energy source is called microwave assisted magnetic recording (MAMR). The following references should be referred: J. G. Zhu and X. Zhu, 'Microwave Assisted Magnetic Recording', The Magnetic Recording Conference (TMRC) 2007 Paper B6 (2007), and Y. Wang and J. G. Zhu, 'Media damping constant and performance characteristics in microwave assisted magnetic recording with circular ac field' JOURNAL of Applied Physics (2009).

In microwave assisted magnetic recording, a system of supplying a microwave magnetic field by a microwave oscillator arranged in a tip end of a magnetic head, and a system of supplying microwave signals (power), the signals being supplied from a microwave signal generation circuit that is independent from the magnetic head, to a microwave generating element are known. The latter is called separate excitation system microwave assisted magnetic recording. With this system, because microwave signals (power) are supplied to a microwave generating element that is formed near a recording head element of a magnetic head slider, there is a need to provide a microwave transmission line onto a head gimbal assembly.

The head gimbal assembly is formed mainly with the magnetic head slider and a suspension. The suspension is formed with a signal transmission line connected to the magnetic head slider, a flexure that supports the magnetic head slider and the signal transmission line, and a load beam that supports the flexure. A configuration in which no load beam is provided is also applicable.

The flexure is needed to secure gimbal function (tracking function of the head above the surface of the magnetic recording medium). In one example, the flexure has a main body part, a support part for the magnetic head slider, and a pair of arm parts that links the main body part and the support part. In order to enhance the gimbal function, it is important to lessen the weight of the signal transmission line mounted on the arm part and the rigidity to enhance deformation performance of the arm part. Therefore, a structure is known in which a separate support part formed of an insulating layer bypassing the outside of the arm part is provided to let the separate support part support the signal transmission line. With this structure, the arm part need not support the signal transmission line, and moreover, an insulating layer for supporting the signal transmission line becomes unnecessary so that reduction in the weight and the rigidity of the arm part is realized.

The above-described configuration can also be applied to the microwave transmission line. Also in this case, the microwave transmission line is supported by the separate support part, so that increase in the weight and the rigidity of the arm part is suppressed due to the same reason. However, with such configuration, a significant impedance mismatch occurs between a line part supported by the separate support part formed of the insulating layer and a line part supported by the flexure, and therefore a significant transmission loss due to the impedance mismatch occurs at the separate support part. A mismatch loss at the separate support part is not a significant problem when recording/reproducing signals with low frequency are transmitted; however, when microwave signals are transmitted, it is too large to ignore.

An object of the present invention is to provide a suspension that can suppress the effects on the gimbal function and that can realize a microwave signal transmission line that can reduce a transmission loss of microwave signals.

SUMMARY OF THE INVENTION

According to one embodiment of the present invention, a suspension is configured to support a magnetic head slider having a recording head element for recording to a magnetic recording medium and a microwave generating element that applies a high-frequency magnetic field to the magnetic recording medium when recording to the magnetic recording medium is conducted by the recording head element. The suspension has a flexure that supports the magnetic head slider, a microwave signal transmission line and a recording signal transmission line that are supported by the flexure. The microwave signal transmission line is connected to the microwave generating element and configured to transmit microwave signals for generating the high-frequency magnetic field, the recording signal transmission line is connected to the recording head element and configured to transmit recording signals. The flexure has a main body part, a support part for the magnetic head slider, and a linkage part that links the main body part and the support part. The microwave signal transmission line and the recording signal transmission line are supported between the main body part and the support part by a separate support part separated from the flexure, and a portion of the separate support part that supports the microwave signal transmission line has a first lamination structure in which a first ground layer that is conductive and a first insulating layer that supports the microwave signal transmission line are laminated.

The microwave signal transmission line is supported by the separate support part that has the first lamination structure in which the first ground layer and the first insulating layer are laminated, the microwave signal transmission line receiving significant effects of impedance mismatch and transmitting microwave signals in the microwave frequency bands. The first ground layer has conductivity and functions as a ground during microwave signal transmission, and thereby impedance mismatch is lessened and the transmission loss is reduced. The recording signal transmission line is also supported by the separate support part and does not pass the linkage part of the suspension, and thereby an increase in the total weight and rigidity of the linkage part is prevented and effects on gimbal function can be suppressed.

Therefore, according to the present invention, the suspension that can suppress the effect on the gimbal function and that can realize the microwave signal transmission line that can reduce a transmission loss of microwave signals can be provided.

The above description, as well as other objects, features, and advantages of the present specification will be evident by the detailed description that follows below with reference to attached drawings exemplifying the present specification.

BRIEF DESCRIPTION OF DRAWINGS

FIGS. 3A-3C are plan views and a lateral view of a head gimbal assembly.

FIGS. 4A-4C are schematic views of a configuration of the head gimbal assembly and cross sections thereof.

FIGS. 5A-5C are schematic views of another configuration of the head gimbal assembly and cross sections thereof.

DETAILED DESCRIPTION OF THE INVENTION

Figure 1:
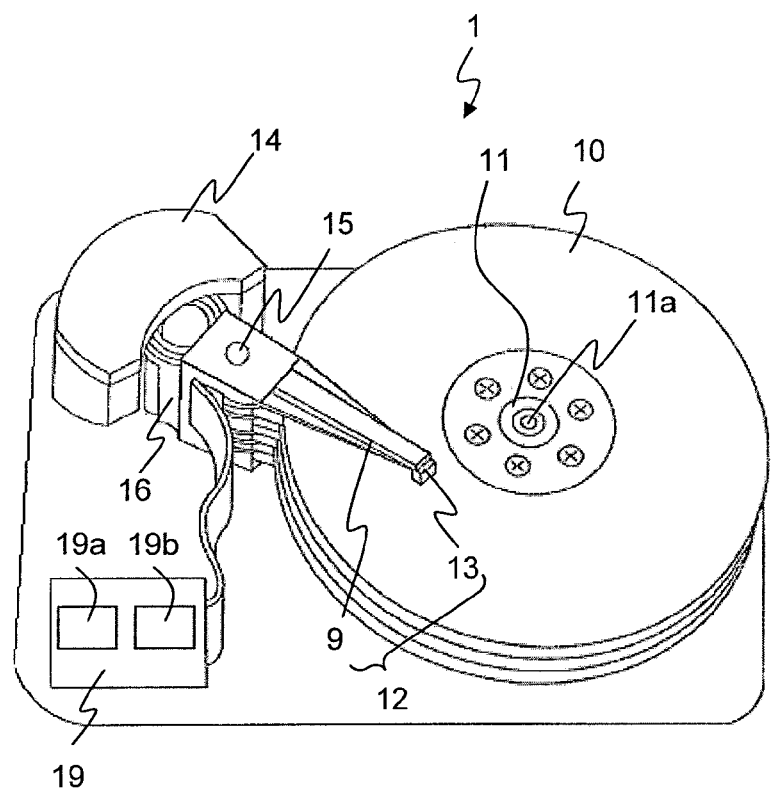
FIG. 1 is a plan view of a magnetic recording device (magnetic disk device).

Hereinafter, descriptions will be given of an embodiment of the present invention with reference to drawings. The dimensions of the configuration elements and the dimensions between the configuration elements in the drawings may differ from the actual configuration for easy viewing in the drawings.

FIG. 1 illustrates a schematic perspective view of a magnetic recording/reproducing device (magnetic disk device). A magnetic recording/reproducing device 1 has a plurality of magnetic recording media (magnetic disks) 10, and a plurality of head gimbal assemblies (HGA) 12 that each includes a magnetic head slider 13. The HGA 12 is configured with the magnetic head slider 13 and a suspension 9 that supports the magnetic head slider 13. The magnetic recording medium 10 rotates around a rotational shaft 11a by a spindle motor 11. The magnetic head slider 13 writes data signals to and reads data signals from the magnetic recording medium 10. In the present invention, the magnetic head slider 13 need only be able to write data signals to the magnetic recording medium 10. The suspension 9 is firmly attached to a carriage 16 that is rotatable around a pivot bearing shaft 15. The suspension 9 conducts positioning of the magnetic head slider 13 above the magnetic recording medium 10 with a voice coil motor (VCM) 14. A recording/reproducing/resonant control circuit 19 controls writing/reading operation of the magnetic head slider 13 and also controls a microwave excitation current for ferromagnetic resonance, which will be described hereinafter. More specifically, the recording/reproducing/resonant control circuit 19 is provided with a microwave signal generation circuit 19a that is connected to microwave signal transmission lines 22c, which will be described hereinafter, and a control unit 19b of the microwave signal generation circuit 19a.

Figure 2:
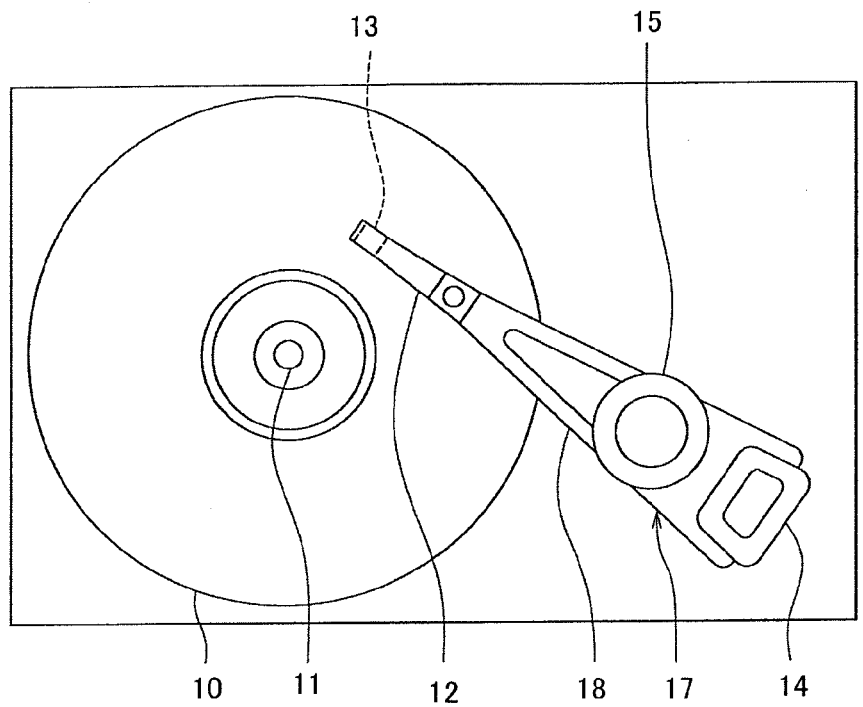
FIG. 2 is a plan view of a head arm assembly.

The HGA 12 may be supported by a drive arm 18 as illustrated in FIG. 2. In this case, a structure in which the HGA 12 and the drive arm 18 are combined may be called a head arm assembly 17. In any one of the configurations of FIG. 1 and FIG. 2, there is no restriction in the number of HGA 12, and only a single piece of the magnetic recording medium 10 and a single piece of the HGA 12 (and a single piece of the drive arm 18) may be provided in the magnetic recording/reproducing device 1. The following description will be given based on the configuration illustrated in FIG. 2.

FIGS. 3A and 3B illustrate a plan view (bottom view viewed from the magnetic recording medium side) and a lateral view of the suspension 9, and FIG. 3C is a partial detail view of a tip end part of the suspension 9 illustrated in FIG. 3A. The suspension 9 has a flexure 21 where the magnetic slider 13 is mounted on one end side thereof and a load beam 20 that presses the magnetic head slider 13 toward the surface of the magnetic recording medium 10 with a prescribed pressure. The flexure 21 is elastically deformable and has a gimbal function of making the magnetic head slider 13 follow the motion of the surface of the magnetic recording medium 10. Transmission lines 22 are formed on the surface of the flexure 21. The flexure 21 is linked to the load beam 20, and the load beam 20 is connected to the drive arm 18 that conducts positioning of the magnetic head slider 13 above the magnetic recording medium.

FIG. 4A is a schematic view of a configuration of the suspension 9 and paths of the transmission lines 22. This drawing is an exploded bottom view of the magnetic head slider 13, the flexure 21, and the load beam 20, which are viewed from the direction A of FIG. 3B. The flexure 21 has a main body part 21a, a support part 21c for the magnetic head slider 13, and a linkage part 21b that links the main body part 21a and the support part 21c. The linkage part 21b is composed of a pair of arm parts 21b, and the arm parts 21b are configured to have lower rigidity compared to the main body part 21a and the support part 21c.

The transmission lines 22 have recording signal transmission lines 22a for transmitting recording signals to a recording head element of the magnetic head slider 13, reproducing signal transmission lines 22b for taking in reproducing output voltage from a reproducing head element, and microwave signal transmission lines (excitation current transmission lines) 22c for transmitting a microwave excitation current. The transmission lines 22 may include, according to the functions of the magnetic head, a heater transmission line for adjusting flying height and a sensor transmission line for detecting flying height (both not illustrated). The transmission lines 22a, 22b, and 22c are typically formed of copper.

As illustrated in FIG. 4A and FIG. 3C, the transmission lines 22a, 22b, and 22c are supported between the main body part 21a and the support part 21c by separate support parts 24 that are separated from the flexure 21. With this configuration, the weight of the lines supported by the arm parts 21b and the weight of an insulating layer, which becomes needed due to this, and also the rigidity of these can be curtailed. Therefore, effects to be given to the gimbal function of the arm parts 21b can be lessened. The separation support parts 24 are provided in a manner of extending between the main body part 21a and the support part 21c, so that effects given from the separate support parts 24 to the gimbal function of the arm parts 21b are also lessened.

FIG. 4B illustrates a cross-sectional view along the line A-A of FIG. 4A. The separate support part 24 has a first lamination structure 53 in which a first ground layer 51 that is conductive, and an insulating layer 50 that supports the transmission lines 22a, 22b, and 22c, are laminated in this order. The first ground layer 51 is preferably formed of a metal with conductivity that is similar to that of a flexure main plate (will be described later) of the flexure 21, and is further preferably formed of a metal with high conductivity, such as copper, gold, silver, or an alloy of these. The insulating layer 50 is formed of polyimide, and the microwave signal transmission line 22c is formed on the insulating layer 50. Although not illustrated, portions between the transmission lines 22a, 22b, and 22c, and upper surfaces of the transmission lines 22a, 22b, and 22c may be covered by an insulating material such as polyimide or the like as necessary. The entirety of the separate support part 24 does not necessarily have the lamination structure 53; at least only a portion of the separate support part 24 that supports the microwave signal transmission line 22c needs to have the lamination structure 53.

FIG. 4C is a cross-sectional view along the line B-B of FIG. 4A. The flexure 21 has a second lamination structure 53a in which a flexure main plate 52 and the insulating layer 50 that supports the transmission lines 22a, 22b, and 22c are laminated in this order. The flexure main plate 52 is formed of a metal such as stainless steel or the like, and functions as a ground of the microwave signal transmission line 22c.

The first ground layer 51 is formed of a conductive metal and thereby functions as a ground of the microwave signal transmission line 22c. Therefore, compared to the case when the separate support part 24 is formed only with an insulating layer, impedance mismatch is lessened so that transmission loss of the microwave signal transmission line 22c is suppressed.

FIGS. 5A-5C are schematic views of a configuration of a suspension 9 according to another embodiment and paths of the transmission lines 22. Paths of the transmission lines 22 illustrated in FIG. 5A are the same as those of FIG. 4A. The configuration of the separate support part 24 illustrated in FIG. 5B is a cross-sectional view along the line A-A of FIG. 5A, and is similar to FIG. 4B, which is described above. FIG. 5C is a cross-sectional view along the line B-B of FIG. 5A. The main body part 21a of the flexure 21 has a lamination structure 53c in which the flexure main plate 52, a second ground layer 51c, and the insulating layer 50 that supports the transmission lines 22a, 22b, and 22c are laminated in this order. The flexure main plate 52 is formed of a metal such as stainless steel or the like. The second ground layer 51c is formed of a metal, such as, for example, copper, gold, or silver, or an alloy of these, that has higher conductivity than that of the flexure main plate 52.

The second ground layer 51c is not necessarily formed on the entire surface of the flexure main plate 52, and at least a portion that supports the microwave signal transmission line 22c needs to have the lamination structure 53c illustrated in FIG. 5C.

The flexure main plate 52 may be formed of a metal such as stainless steel or the like; however, it may also be formed of a resin material with no conductivity. The ground layer 51c is formed of a material, such as, for example, copper, gold, or silver, or an alloy of these, that has higher conductivity than that of the flexure main plate 52.

Accordingly, the first ground layer 51 with high conductivity and the second ground layer 51c with high conductivity function as a ground for signal transmission in the microwave frequency bands by the microwave signal transmission lines 22c. Therefore, compared to the case when the separate support part 24 is formed only with an insulating layer, impedance mismatch is lessened, transmission loss of the main body part 21a of the flexure 21 is improved, and thereby transmission loss of the microwave signal transmission line 22c is suppressed. As will be described later, the thicknesses of the first ground layer 51 and the second ground layer 51c are preferably 0.1 μm or greater and less than 2 μm.

Figure 6:
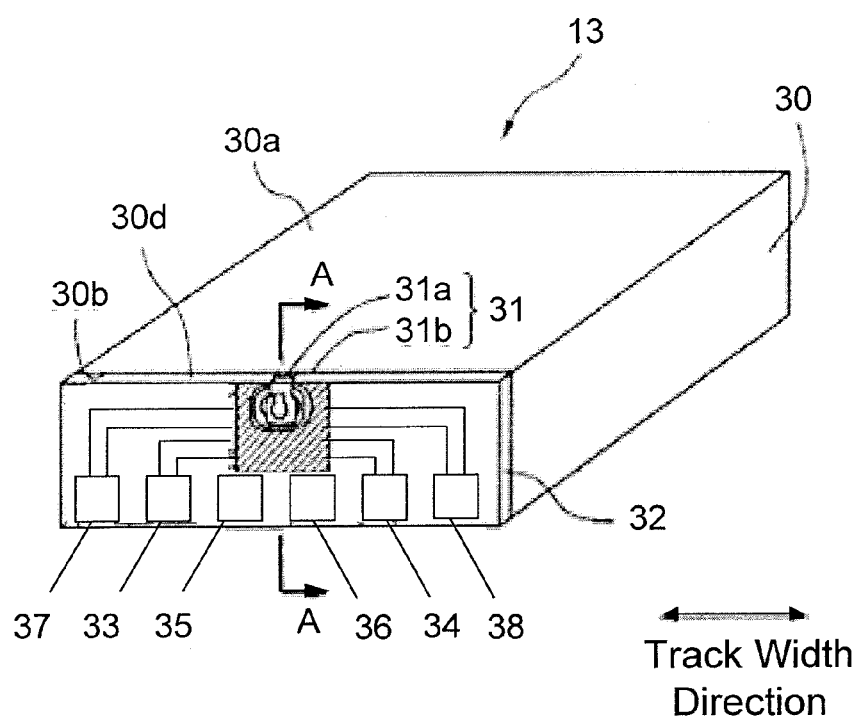
FIG. 6 is a schematic perspective view of a magnetic head slider.

FIG. 6 is a perspective view schematically illustrating the entirety of the magnetic head slider 13 of the present embodiment. The magnetic head slider 13 is provided with a magnetic head slider substrate 30 having an air bearing surface (ABS) 30a that has been processed so as to obtain a suitable flying height, a magnetic head element 31 provided on an element formation surface 30b that is perpendicular to the ABS 30a, a protective part 32 provided on the element formation surface 30b so as to cover the magnetic head element 31, and six terminal electrodes 33, 34, 35, 36, 37, and 38 that are exposed from the surface of the protective part 32. The positions of the terminal electrodes 33, 34, 35, 36, 37, and 38 are not limited to the positions illustrated in FIG. 6, and they may be provided in any arrangement and in any positions on the element formation surface 30b. When a heater and/or a sensor are provided, a terminal electrode that is electrically connected to them is provided.

The magnetic head slider 13 is mainly configured with a magneto-resistive effect (MR) reproducing head element 31a for reading data signals from the magnetic recording medium, and a recording head element 31b for writing data signals to the magnetic recording medium. The terminal electrodes 33 and 34 are electrically connected to the MR reproducing head element 31a, the terminal electrodes 37 and 38 are electrically connected to the recording head element 31b, and the terminal electrodes 35 and 36 are electrically connected to the microwave generating element 39 (FIG. 8), which will be described hereinafter.

Tip ends of the transmission lines 22a, 22b, and 22c on the magnetic head slider 13 side are respectively connected to terminal electrodes of the recording head element 31b, the reproducing head element 31a, and the microwave generating element 39 by ball bonding in the present embodiment. Also, the transmission lines 22a, 22b, and 22c may respectively be connected to the terminal electrodes by wire bonding instead of ball bonding.

In the MR reproducing head element 31a and the recording head element 31b, the respective end parts of the elements are positioned on the ABS 30a (more specifically, on a magnetic head slider end surface 30d of the ABS 30a). When one end of the MR reproducing head element 31a and one end of the recording head element 31b oppose the magnetic recording medium, reproduction of data signals by sensing a signal magnetic field and recording of data signals by applying a signal magnetic field are conducted. An extremely thin diamond-like carbon (DLC) or the like is coated for protection on the respective end parts of the elements on the ABS 30a and its vicinity.

Figure 7:
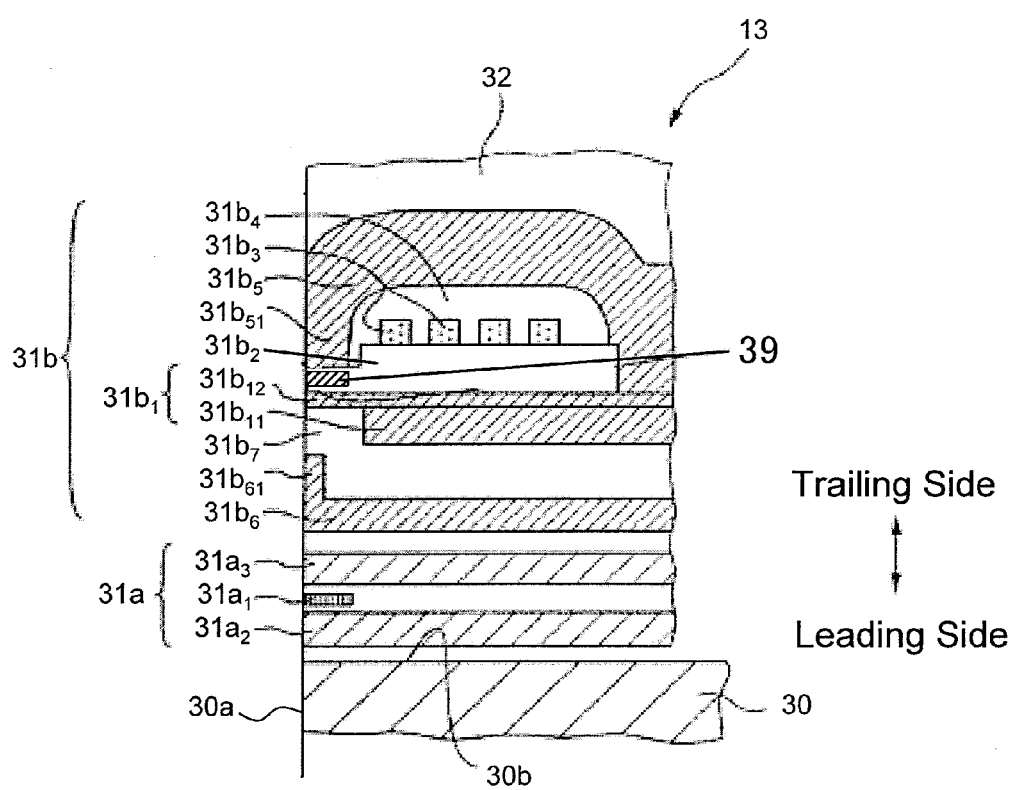
FIG. 7 is a cross sectional view of the magnetic head slider.

FIG. 7 is a cross-sectional view along the line A-A of FIG. 6. The MR reproducing head element 31a, the recording head element 31b, the microwave generating element 39, and the protective part 32 that protects these elements, are mainly formed above the element formation surface 30b of the magnetic head slider substrate 30 made of ALTIC ($Al_2O_3$—TiC).

The MR reproducing head element 31a includes an MR stack $31a_1$, and a lower shield layer $31a_2$ and an upper shield layer $31a_3$ that are arranged in a position to sandwich the stack. The MR stack $31a_1$ is composed of a current-in-plane (CIP) GMR multilayer film, a current-perpendicular-to-plane (CPP) GMR multilayer film, or a TMR multilayer, and senses a signal magnetic field from the magnetic recording medium. The lower shield layer $31a_2$ and the upper shield layer $31a_3$ prevent effects from external magnetic fields, which would be noise for the MR stack $31a_1$.

The recording head element 31b has a configuration for perpendicular magnetic recording. More specifically, the recording head element 31b is provided with a main pole layer $31b_1$, a trailing gap layer $31b_2$, a writing coil $31b_3$ formed in a manner of passing between the main pole layer $31b_1$ and an auxiliary pole layer $31b_5$, a writing coil insulating layer $31b_4$, the auxiliary pole layer $31b_5$, an auxiliary shield layer $31b_6$, and a leading gap layer $31b_7$. The main pole layer $31b_1$ is a main pole of the recording head element 31b, and generates a writing magnetic field from an end part of the ABS 30a side of the main pole layer $31b_1$ at the time of writing data signals.

The main pole layer $31b_1$ is a magnetic guide path. The magnetic guide path guides a magnetic flux, while letting the magnetic flux focus, to a magnetic recording layer of the magnetic recording medium. Herein, the magnetic flux is generated by applying a write current to the writing coil $31b_3$, and the magnetic recording layer is a layer to which writing is conducted. The main pole layer $31b_1$ is configured with a main pole yoke layer $31b_{11}$ and a main pole major layer $31b_{12}$.

The auxiliary pole layer $31b_5$ and the auxiliary shield layer $31b_6$ are arranged respectively in the trailing side and the leading side of the main pole layer $31b_1$.

The end parts of the ABS 30a sides of the auxiliary pole layer $31b_5$ and the auxiliary shield layer $31b_6$ are respectively a trailing shield part $31b_{51}$ and a leading shield part $31b_{61}$ that each has a wider layer cross section than the other portions. The trailing shield part $31b_{51}$ opposes the end part of the ABS 30a side of the main pole layer $31b_1$ through the trailing gap layer $31b_2$ therebetween. Further, the leading shield part $31b_{61}$ opposes an end part of a magnetic head slider end surface 30d side of the main pole layer $31b_1$ through the leading gap layer $31b_2$ therebetween. By providing the trailing shield part $31b_{51}$ and the leading shield part $31b_{61}$ that are described above, a magnetic field gradient of a recording magnetic field between the end part of the trailing shield part $31b_{51}$ and the end part of the main pole layer $31b_1$ and between the end part of the leading shield part $31b_{61}$ and the end part of the main pole layer $31b_1$ becomes even steeper due to a magnetic flux shunt effect. As a result, signal output jitter is diminished, and thereby an error rate at the time of reading can be diminished.

It is also possible to provide a so-called side surface shield by suitably processing the auxiliary main pole layer $31b_5$ or the auxiliary shield layer $31b_6$ and arranging a portion of the auxiliary main pole layer $31b_5$ or the auxiliary shield layer $31b_6$ near both sides of the main pole layer $31b_1$ in the track width direction. In this case, the magnetic flux shunt effect is enhanced.

The microwave generating element 39 is formed between the main pole major layer $31b_{12}$ of the main pole layer $31b_1$ and the trailing shield part $31b_{51}$ of the auxiliary pole layer $31b_5$.

Figure 8:
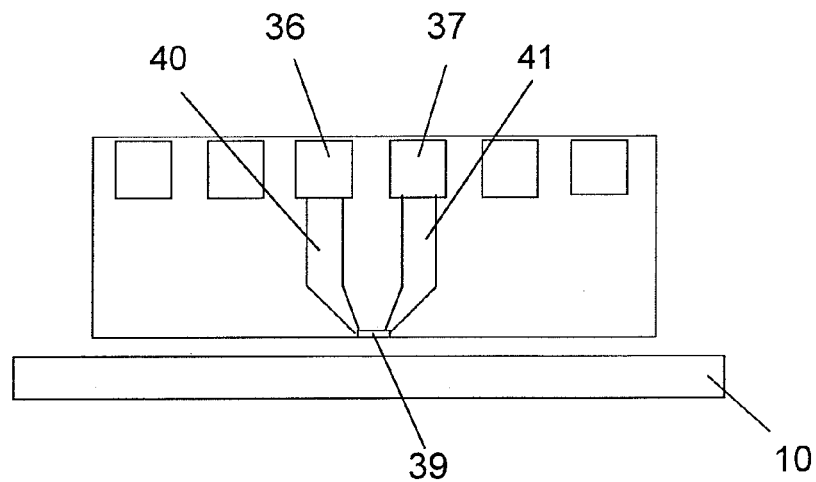
FIG. 8 is a schematic view of a structure of a microwave generating element.

FIG. 8 is a drawing of a configuration of the microwave generating element viewed from the element formation surface 30b of the magnetic head slider 13. The microwave generating element 39 exposed to the ABS surface of the magnetic head slider 13 and the terminal electrodes 36 and 37 are electrically connected by wiring members 40 and 41, and the microwave generating element 39 generates a microwave magnetic field by supplying a microwave excitation current from the terminal electrodes to apply the microwave magnetic field to the adjacent magnetic recording medium 10.

Figure 9:
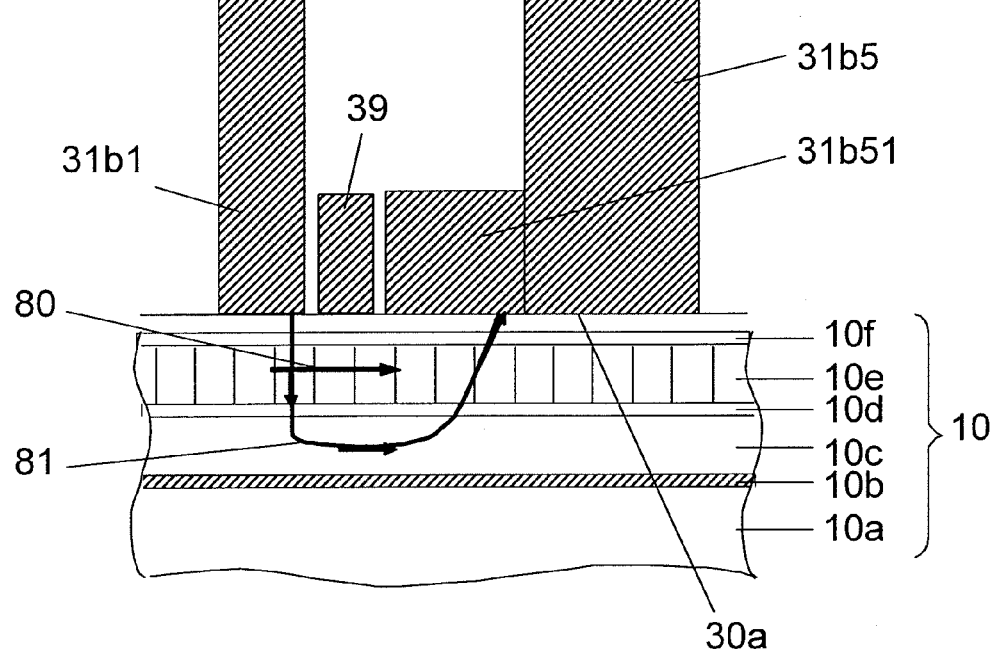
FIG. 9 is a schematic view for explaining the principle of a microwave assisted magnetic recording method.

FIG. 9 is a cross-sectional view for explaining the principle of the microwave assisted magnetic recording method. The magnetic recording medium 10 is for perpendicular magnetic recording, and has a multilayered structure in which a magnetization orientation layer 10b, a soft magnetic under layer 10c that functions as a part of the magnetic flux loop circuit, an intermediate layer 10d, a magnetic recording layer 10e, and a protective layer 10f are sequentially laminated above a disk substrate 10a.

The magnetization orientation layer 10b stabilizes a magnetic domain structure of the soft magnetic under layer 10c to enhance suppression of spike noise in the reproducing output waveform by applying magnetic anisotropy in the track width direction to the soft magnetic under layer 10c. The intermediate layer 10d functions as a base layer that controls magnetization orientation and particle size of the magnetic recording layer 10e.

The ferromagnetic resonant frequency FR of the magnetic recording layer 10e is an inherent value determined by shape, size, configuration elements, and the like of magnetic particles that configure the magnetic recording layer 10e; however, generally it is approximately 10-50 GHz.

A microwave magnetic field is generated in the periphery of the microwave generating element 39 by applying a microwave excitation current to a conductor that configures the microwave generating element 39. A resonant magnetic field 80 is applied in a substantially in-plane direction of the magnetic recording medium within the magnetic recording medium because the microwave generating element 39 is adjacent to the magnetic recording medium. The resonant magnetic field 80 is a high-frequency magnetic field in the microwave frequency bands having the ferromagnetic resonant frequency FR of the magnetic recording layer 10e of the magnetic recording medium 10 or a frequency close to the ferromagnetic resonant frequency FR.

The coercive force of the magnetic recording layer 10e can be efficiently reduced by applying the resonant magnetic field 80 in a superimposition manner to a perpendicular recording magnetic field 81 that is applied to the magnetic recording layer from the main pole layer $31b_1$ of the recording head element 31b. As a result, the intensity of the writing magnetic field in the perpendicular direction (perpendicular or substantially perpendicular direction to a top layer surface of the magnetic recording layer 10e), the writing magnetic field being necessary for writing, can significantly be reduced. When the coercive force is reduced, magnetization reversal is more likely to occur. Thereby recording can efficiently be conducted with a small recording magnetic field.

Next, frequency dependency of transmission loss of microwave was calculated for various microwave transmission lines. FIG. 4B illustrates a cross section of a transmission line of an example. In the example, in the separate support part, an insulating layer 50 made of polyimide and a transmission line 22c made of Cu were formed on a first ground layer 51 made of stainless (conductivity of $1.1 \times 10^6$ [S/m]). A comparative example had the configuration of the example from which the first ground layer 51 was removed. In the example, the first ground layer 51 functions as a ground; in contrast, in the comparative example, no layer that functions as a ground was provided. It was assumed in the following analysis that only one micro transmission line was formed on the insulating layer.

Figure 10:
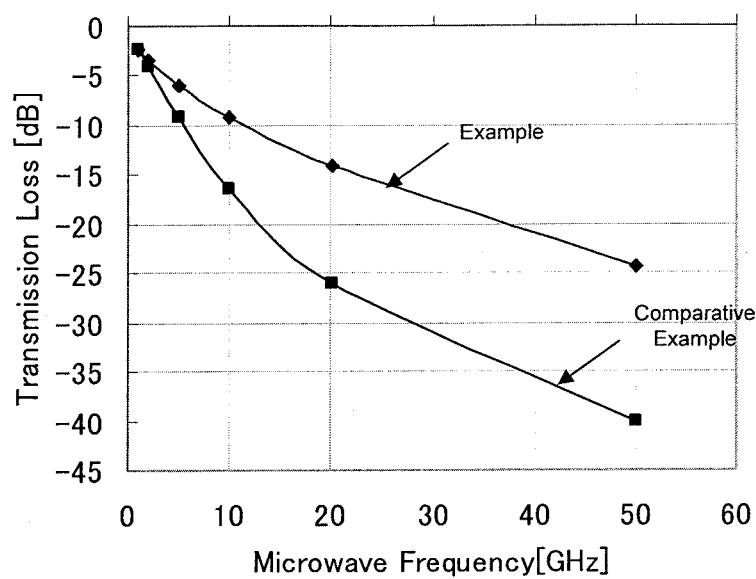
FIG. 10 illustrates loss simulation of transmission lines (a separate support part formed with a ground layer made of stainless steel).

FIG. 10 illustrates the transmission loss of microwave signals in the frequency region of 1-50 GHz. The transmission loss was significantly improved in the example compared to the comparative example.

Figure 11:
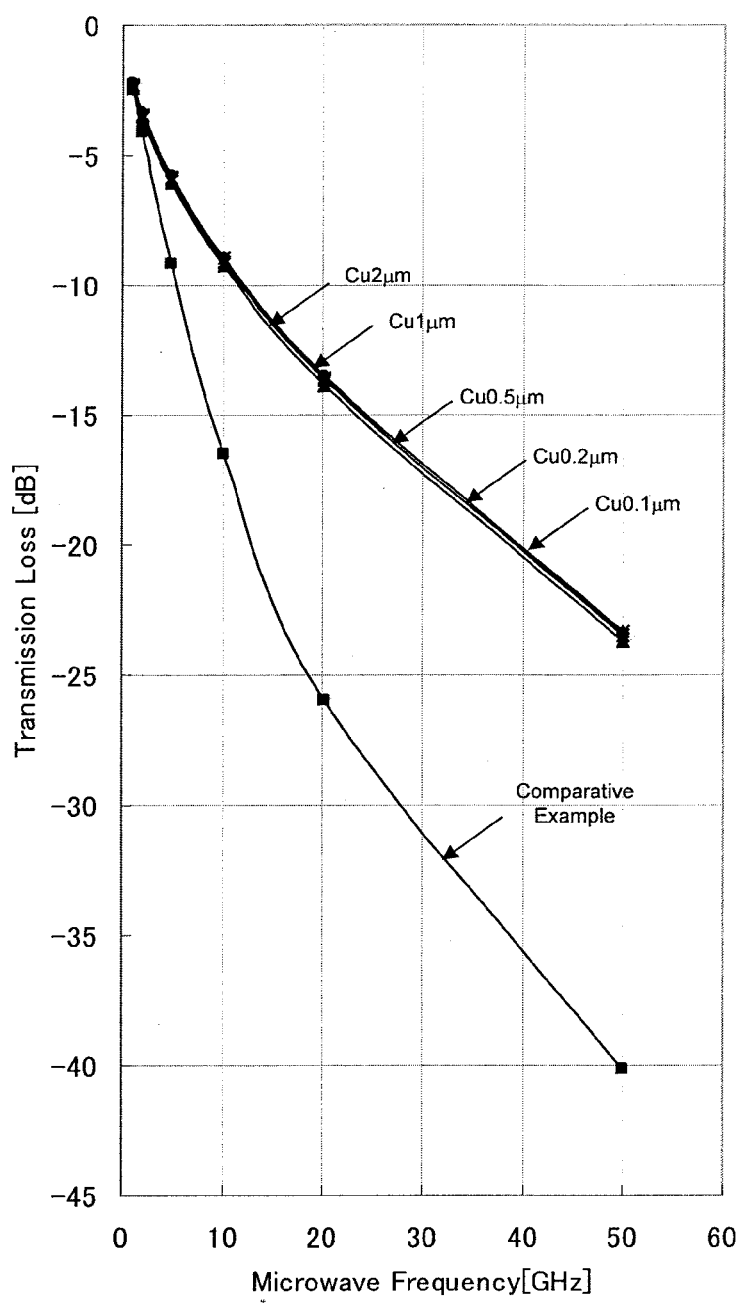
FIG. 11 illustrates loss simulation of transmission lines (a separate support part formed with a Cu ground layer).
Figure 12:
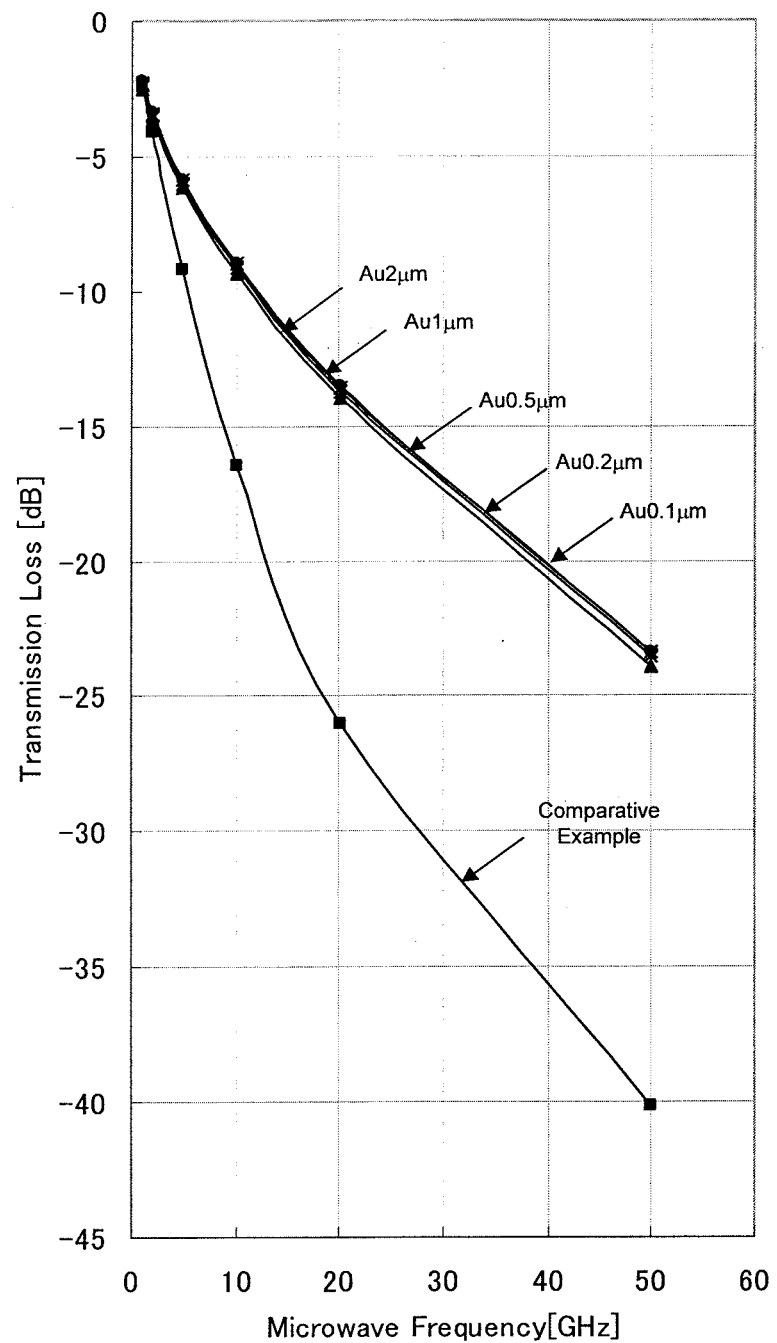
FIG. 12 illustrates loss simulation of transmission lines (a separate support part formed with an Au ground layer).

FIG. 11 illustrate the transmission loss of microwave signals of an example that has the configuration of FIG. 4B and uses a Cu layer 51 (conductivity of $5.8 \times 10^7$ [S/m]) as the first ground layer. Similarly, FIG. 12 illustrate the transmission loss of microwave signals of an example that has the configuration of FIG. 4B and uses an Au layer 51 (conductivity of $4.4 \times 10^7$ [S/m]) as the first ground layer. The transmission losses were significantly improved in both of the examples compared to the comparative example. This is because the ground layer provided on the separate support part functions as a ground during microwave signal transmission. Because the transmission loss improvement effects of FIGS. 10-12 are almost the same, the effect of the materials of the first ground layer 51 provided on the separate support part 24 is small. When the average conductivity is between approximately $1 \times 10^6$ [S/m] (conductivity of stainless metal) and approximately $6 \times 10^7$ [S/m] (conductivity of Cu and Au), similar effects can be obtained. Therefore, the material of the first ground layer 51 can be suitably selected from the viewpoint of processing condition, cost, and the like.

Figure 13:
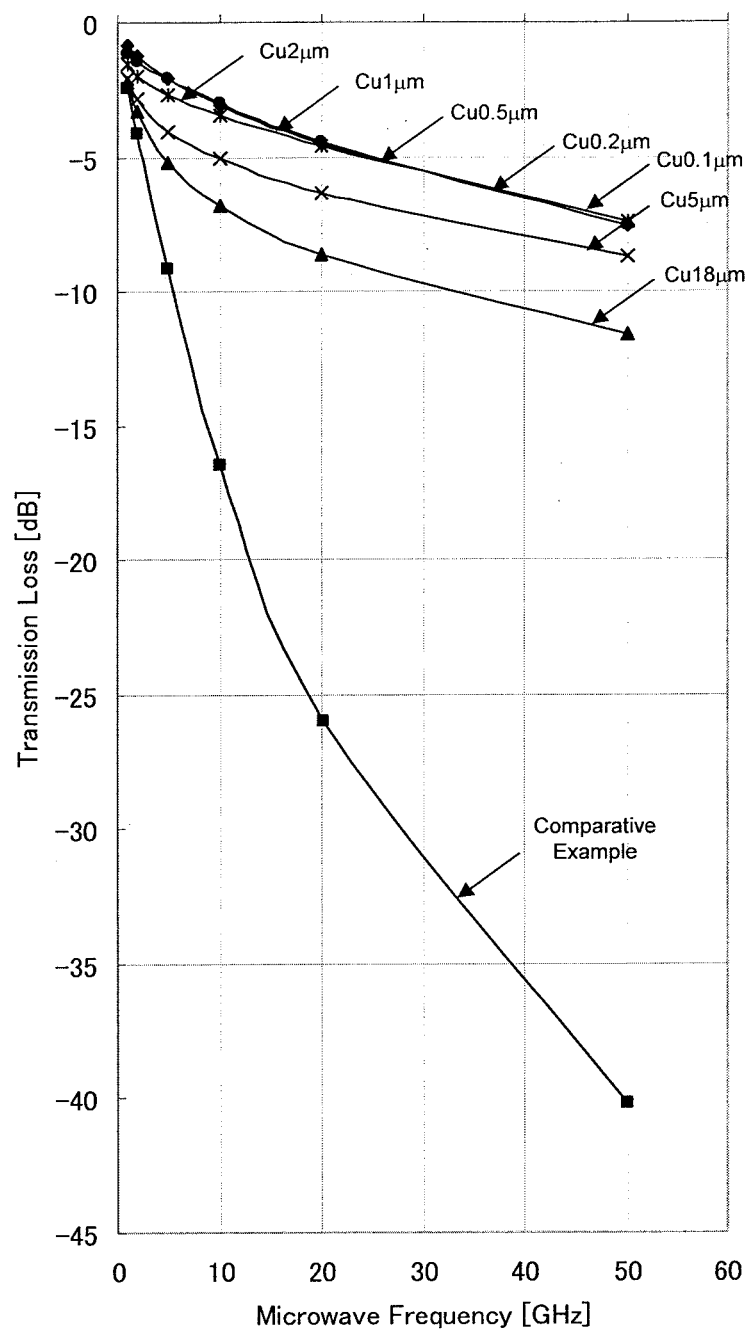
FIG. 13 illustrates loss simulation of transmission lines (a separate support part formed with a Cu ground layer and a flexure formed with a Cu ground layer).
Figure 14:
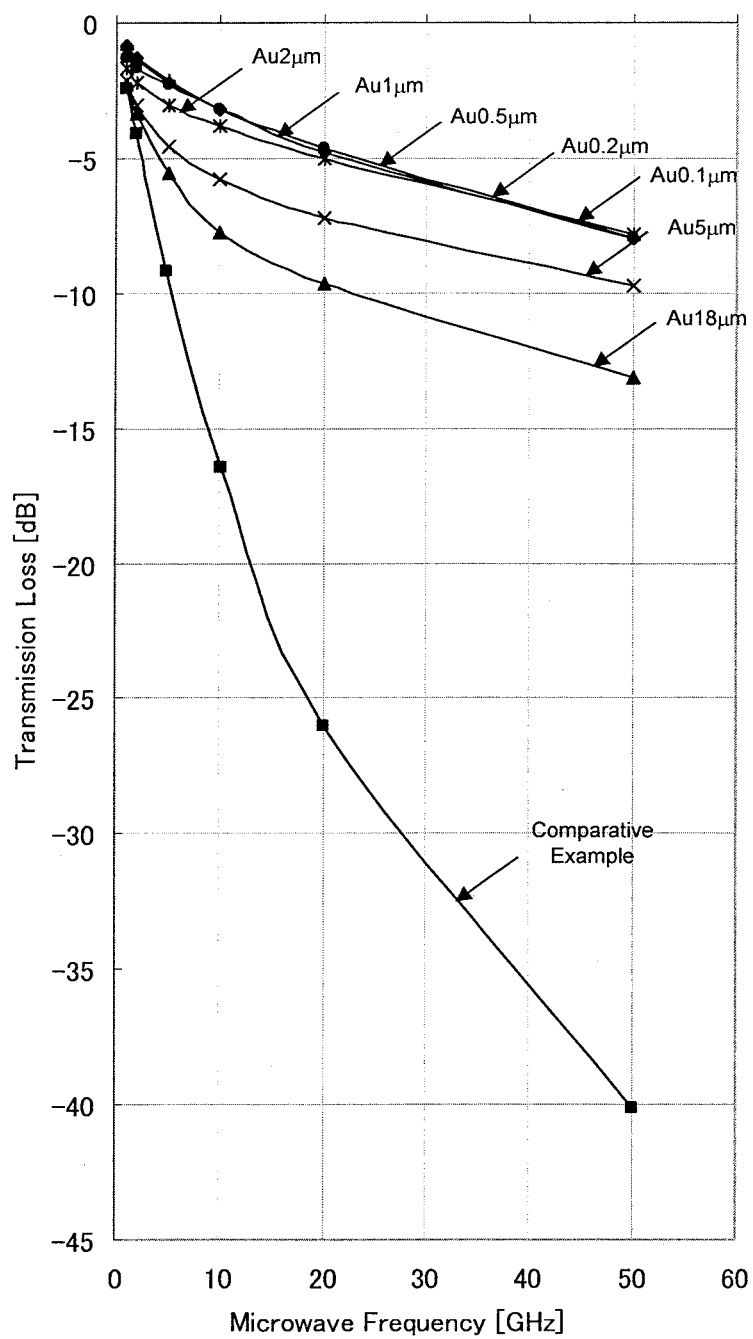
FIG. 14 illustrates loss simulation of transmission lines (a separate support part formed with an Au ground layer and a flexure formed with an Au ground layer).

Next, transmission loss of the case when a Cu layer or an Au layer was provided in both the separate support part 24 and the main body part 21a was obtained. The configuration of the separate support part 24 was as illustrated in FIG. 5B and the configuration of the main body part 21a was as illustrated in FIG. 5C. In other words, in almost the entirety of the path on which the microwave transmission line 22c passes, a Cu layer or an Au layer was formed as a ground. FIG. 13 illustrates the transmission loss of the case when a Cu layer was provided, and FIG. 14 illustrates the transmission loss of the case when an Au layer was provided. Compared to the above-described case when the ground layer was provided only in the separate support part 24, the further significant improvement of the transmission characteristic was obtained. This is because, in almost the entirety of the path of the microwave transmission line, the Cu layer or the Au layer functioned as a ground. Because the transmission loss improvement effects in FIG. 13 and FIG. 14 are almost the same, the material of the ground layer can be suitably selected from the viewpoint of processing condition, cost, and the like. In both of the cases, the transmission loss improvement effects were observed when the Cu layer or the Au layer had a thickness of 0.1 µm or more, and were saturated when a thickness was 2.0 µm or more. The ground layers formed in the separate support part 24 and the flexure 21 are preferably thin to the extent possible from the viewpoint of the gimbal function of the suspension, and therefore the thicknesses of the Cu layer and the Au layer are preferably less than 2 µm (upper limit). Therefore, in both of the cases, the thicknesses of the Cu layer and the Au layer are preferably in the range of 0.1 µm or more and 2.0 µm or less.

Also, when the ground layer is provided in the flexure main plate, the flexure main plate need not function as a ground. Therefore, materials of the flexure main plate can be selected from spring characteristics suitable for the flexure main plate, not depending on electrical characteristics. For example, a resin material, such as engineering plastic materials, polycarbonate, or the like, that has preferable elasticity.

Also, because large microwave loss effects were obtained in the cases of Cu 18 µm and Au 18 µm illustrated in FIG. 13 and FIG. 14, it is obvious that the same effect as the case when the ground layer was provided can be obtained even when the flexure main plate itself was made of copper, gold, silver, or an alloy material of these.

The transmission loss improvement effects are obtained even in the vicinity of 1 GHz that is the transmission band of recording/reproducing signals. Therefore, provision of a ground layer in the portion that supports recording and reproducing signal lines leads the effect on improving the transmission loss of recording/reproducing signals.

According to the embodiment described above, the suspension is configured from the flexure and the load beam, and the load beam functions to press the magnetic head slider against the surface of the magnetic recording medium with a prescribed pressure. On the other hand, the flexure may also functions as described above by adjusting the thickness, the material type, and the shape of the flexure. For example, it is possible to have the shape in which the width of the flexure becomes gradually wider toward the mounting direction of a drive arm 18. It is evident that similar effects can be obtained from a suspension configured only with such a flexure.

Several preferable embodiments of the present invention have been illustrated and described in detail; however, it is understood that various changes and modifications can be made without departing from the essence and scope of the attached claims.

What is claimed is:

1. A suspension that is configured to support a magnetic head slider having a recording head element for recording to a magnetic recording medium and a microwave generating element that applies a high-frequency magnetic field to the magnetic recording medium when recording to the magnetic recording medium is conducted by the recording head element, comprising:

a flexure that supports the magnetic head slider; and a microwave signal transmission line and a recording signal transmission line that are supported by the flexure, the microwave signal transmission line being connected to the microwave generating element and configured to transmit microwave signals for generating the high-frequency magnetic field, the recording signal transmission line being connected to the recording head element and configured to transmit recording signals, wherein the flexure has a main body part, a support part for the magnetic head slider, and a linkage part that links the main body part and the support part, the microwave signal transmission line and the recording signal transmission line are supported between the main body part and the support part by a separate support part separated from the flexure, and a portion of the separate support part that supports the microwave signal transmission line has a first lamination structure in which a first ground layer that is conductive and a first insulating layer that supports the microwave signal transmission laminated, wherein a portion of the main body part of the flexure that supports the microwave signal transmission line has a second lamination structure in which a flexure main plate, a second ground layer that is conductive and has higher conductivity than that of the flexure main plate, and a second insulating layer that supports the microwave signal transmission line are laminated in this order, and the second lamination structure is continuously provided along the microwave signal transmission line on an entirety of the portion of the main body part of the flexure where the microwave signal transmission line is supported.

2. The suspension according to claim 1, wherein the microwave signal transmission line is configured to transmit microwave signals of 1-50 GHz.

3. The suspension according to claim 1, wherein the first ground layer has a thickness of 0.1 μm or more and less than 2 μm.

4. The suspension according to claim 1, wherein the first ground layer is formed of stainless steel or is formed of copper, gold, or silver, or an alloy of these.

5. The suspension according to claim 1, wherein the magnetic head slider has a reproducing head element for reproducing data signals from the magnetic recording medium, and the suspension has a reproducing signal transmission line that is connected to the reproducing head element and transmits reproducing signals, and a portion of the separate support part that supports the reproducing signal transmission line has the first lamination structure.

6. The suspension according to claim 1, wherein the flexure main plate is formed of stainless steel, and the second ground layer is formed of copper, gold, or silver, or an alloy of these.

7. The suspension according to claim 1, wherein the flexure main plate is formed of a conductive material with higher conductivity than that of stainless steel.

8. The suspension according to claim 7, wherein the flexure main plate is formed of copper, gold, or silver, or an alloy of these.

9. The suspension according to claim 1, further comprising;
a load beam connected to an arm that conducts positioning of the magnetic head slider above the magnetic recording medium;
wherein the flexure is linked to the load beam and that supports the magnetic head slider.

10. The suspension according to claim 1, wherein the flexure is connected to an arm that conducts positioning of the magnetic head slider above the magnetic recording medium.

11. A head gimbal assembly, comprising;
the suspension according to claim 1 and the magnetic head slider.

12. A magnetic recording device, comprising:
the head gimbal assembly according to claim 11;
a microwave signal generation circuit connected to the microwave signal transmission line; and
a control part of the microwave signal generation circuit.

13. A suspension that is configured to support a magnetic head slider having a recording head element for recording to a magnetic recording medium and a microwave generating element that applies a high-frequency magnetic field to the magnetic recording medium when recording to the magnetic recording medium is conducted by the recording head element, comprising:
a flexure that supports the magnetic head slider; and
a microwave signal transmission line and a recording signal transmission line that are supported by the flexure, microwave signal transmission line being connected to the microwave generating element and configured to transmit microwave signals for generating the high-frequency magnetic field, the recording signal transmission line being connected to the recording head element and configured to transmit recording signals, wherein
the flexure has a main body part, a support part for the magnetic head slider, and a linkage part that links the main body part and the support part,
the microwave signal transmission line and the recording signal transmission line are supported between the main body part and the support part by a separate support part separated from the flexure, and a portion of the separate support part that supports the microwave signal transmission line has a first lamination structure in which a first ground layer that is conductive and a first insulating layer that supports the microwave signal transmission line are laminated, wherein
the first ground layer is a layer with a thickness of 0.1 μm or more and less than 2 μm formed of copper, gold, or silver, or an alloy of these,
a portion of the main body part of the flexure that supports the microwave signal transmission line has a second lamination structure in which a flexure main plate formed of stainless steel, a second ground layer with a thickness of 0.1 μm or more and less than 2 μm formed of copper, gold, or silver, or an alloy of these, and a second insulating layer that supports the microwave signal transmission line are laminated in this order, and
the second lamination structure is continuously provided along the microwave signal transmission line on an entirety of the portion of the main body part of the flexure where the microwave signal transmission line is supported.

* * * * *